(12) United States Patent
Deutschman et al.

(10) Patent No.: US 12,715,699 B2
(45) Date of Patent: Aug. 25, 2026

(54) IFLEX CONVEYOR SYSTEM WITH GAPPING CAPABILITY FOR EFFICIENT PRODUCT TRANSFER HAVING RIVETED X-BRACE

(71) Applicant: Cornerstone Automation Systems, LLC, Frisco, TX (US)

(72) Inventors: Andrew Glen Deutschman, Omaha, NE (US); Jonathan Hogan Webb, Allen, TX (US); Justin Matthew Rodriguez, Denton, TX (US)

(73) Assignee: Cornerstone Automation Systems, LLC, Frisco, TX (US)

( * ) Notice: Subject to any disclaimer, the term of this patent is extended or adjusted under 35 U.S.C. 154(b) by 183 days.

(21) Appl. No.: 18/608,241

(22) Filed: Mar. 18, 2024

(65) Prior Publication Data

US 2024/0308773 A1 Sep. 19, 2024

Related U.S. Application Data

(60) Provisional application No. 63/490,691, filed on Mar. 16, 2023.

(51) Int. Cl.
*B65G 13/12* (2006.01)
*B65G 21/14* (2006.01)

(52) U.S. Cl.
CPC ............. *B65G 13/12* (2013.01); *B65G 21/14* (2013.01)

(58) Field of Classification Search
None
See application file for complete search history.

(56) References Cited

U.S. PATENT DOCUMENTS

| | | | | |
|---|---|---|---|---|
| 3,276,558 A * | 10/1966 | Guske | B65G 13/12 193/35 TE |
| 4,852,712 A * | 8/1989 | Best | B65G 13/12 414/373 |
| 5,147,025 A * | 9/1992 | Flippo | B65G 13/07 198/782 |
| 5,456,347 A * | 10/1995 | Best | B65G 47/261 198/782 |
| 5,632,371 A * | 5/1997 | Best | B65G 13/07 193/35 TE |
| 10,230,315 B2 * | 3/2019 | Ramezani | B65G 21/14 |
| 11,155,417 B2 * | 10/2021 | Karol | B65G 23/44 |

* cited by examiner

*Primary Examiner* — Kavel Singh

(57) ABSTRACT

The disclosure provides improved X-bars and end frames that can prevent or at least reduce sagging in conveyors, such as flexible conveyors. The improved X-bars and end frames are referred to as riveted X-bars and leg plates, respectively. An expandable conveyor system, an expandable conveyor segment, and a riveted assembly are disclosed. Expandable conveyor segments can be coupled together via a riveted assembly to form an expandable conveyor system. In one example, the riveted assembly includes; (1) a leg plate and (2) two riveted x-bars connected to the leg plate via at least one slot insert.

19 Claims, 14 Drawing Sheets

385
335
395
540
537
539
535
520
510
501
530
532
534
320

385
335
395
539
537
535
520
510
501
532
530
534
320

IFLEX CONVEYOR SYSTEM WITH GAPPING CAPABILITY FOR EFFICIENT PRODUCT TRANSFER HAVING RIVETED X-BRACE

CROSS-REFERENCE TO RELATED APPLICATION

This application claims the benefit of U.S. Provisional Application Ser. No. 63/490,691, filed by Andrew Glen Deutschman, et al. on Mar. 16, 2023, entitled "IFLEX CONVEYOR SYSTEM WITH GAPPING CAPABILITY FOR EFFICIENT PRODUCT TRANSFER HAVING RIVETED X-BRACE," commonly assigned with this application and incorporated herein by reference in its entirety.

TECHNICAL FIELD

This application is directed to product transfer equipment, and more specifically, a flexible conveyor having gapping capability for providing more efficient product transfer capabilities.

BACKGROUND

The retail supply chain has evolved in the last 20 years. Retail warehouses, which once served merely to hold inventory have now evolved into a more dynamic entity. A retail warehouse may be expected to perform the functions of an automated fulfillment center. As such, there may be a need for more purpose-built automation equipment. Product receiving, scanning and sorting/distribution are generally performed in a retail warehouse. With dedicated equipment and customer inventory, retail warehouse space may be limited. What is needed is compact equipment that can fit into the tight space confines of a retail warehouse and be portable enough to be moved around to make optimum use of available floor space.

SUMMARY

In one aspect, the disclosure provides an expandable conveyor segment. In one example, the expandable conveyor segment includes: (1) a leg plate, (2) a plurality of riveted x-bars coupled with the leg plate, (3) a plurality of rollers coupled to the plurality of riveted x-bars.

In another aspect, the disclosure provides a riveted assembly for use with a conveyor or other flexible transport system. In one example, the riveted assembly includes: (1) a leg plate and (2) two riveted x-bars connected to the leg plate via at least one slot insert.

In yet another aspect, an expandable conveyor system is disclosed. In one example, the expandable conveyor system includes: (1) two or more conveyor segments, wherein each of the conveyor segments have a plurality of rollers and are coupled together via a riveted assembly, wherein the riveted assembly includes a leg plate and two riveted x-bars connected to the leg plate via at least one slot insert.

BRIEF DESCRIPTION

Reference is now made to the following descriptions taken in conjunction with the accompanying drawings and illustrations in which.

Figures 5A, 5B:
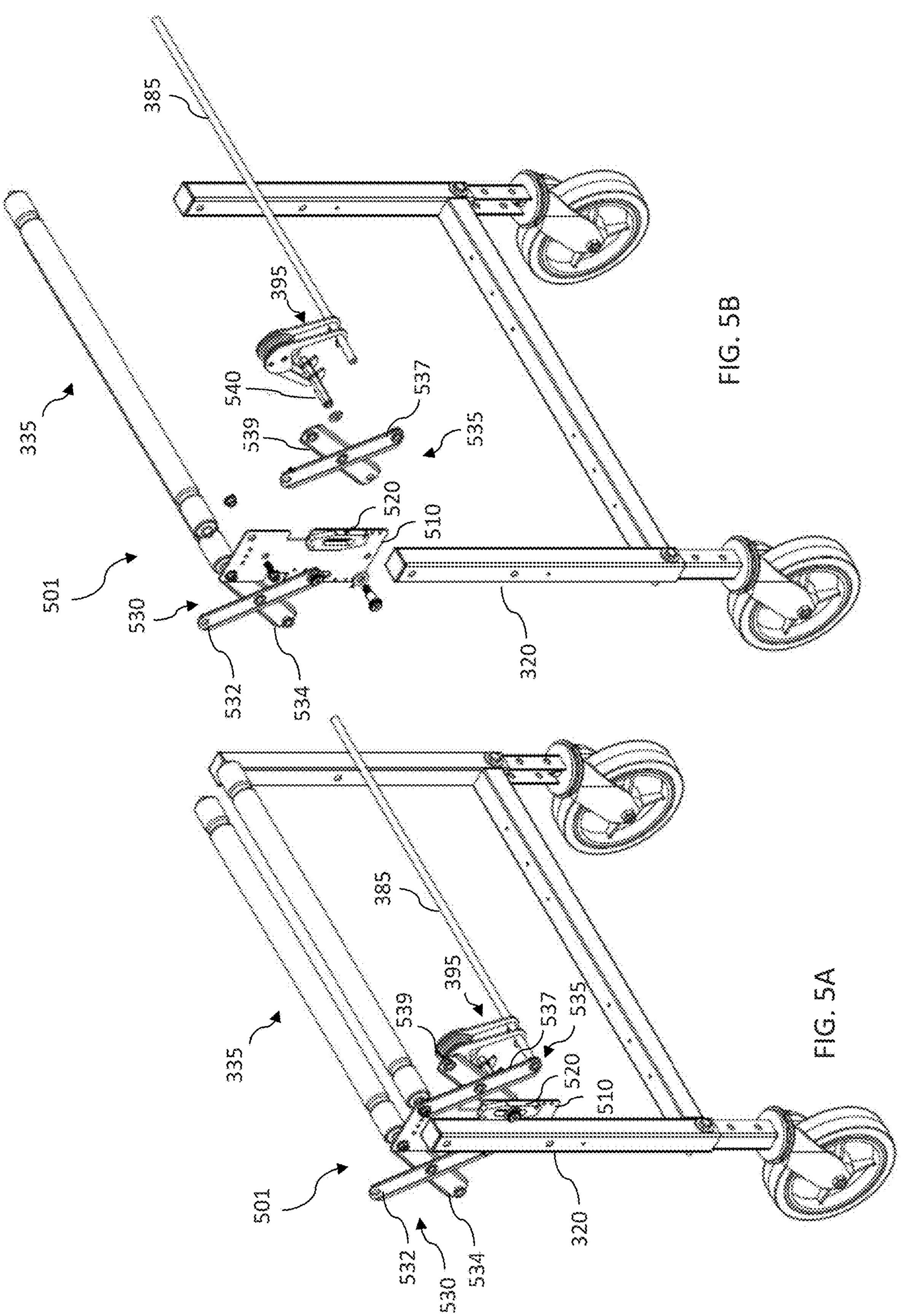
Figure 5C:
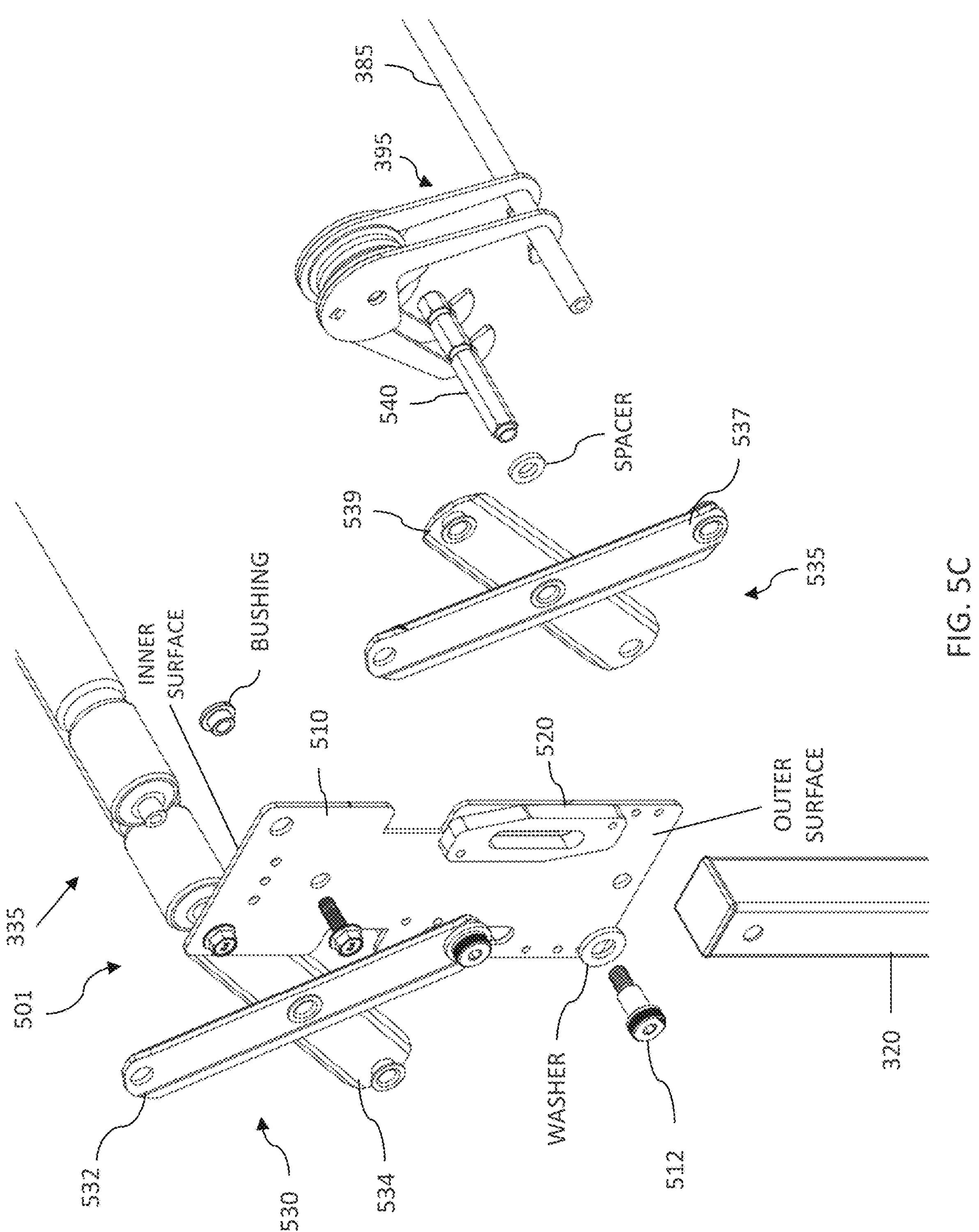
Figures 6A, 6B:
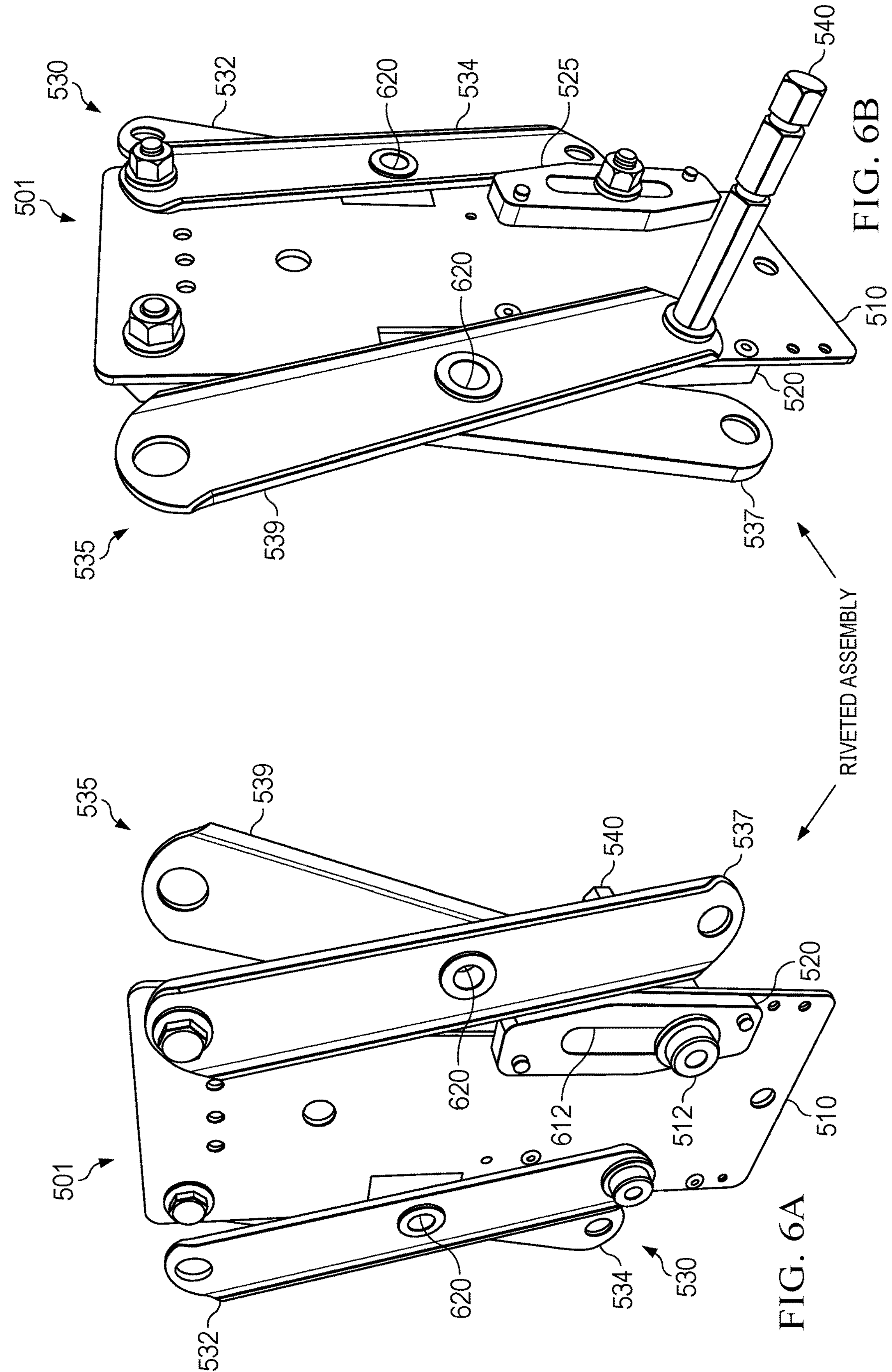

FIGS. 5A, 5B, and 5C illustrate a riveted assembly attached to a leg of a conveyor, wherein the riveted assembly includes an example of a leg plate and riveted X-bars; and FIGS. 6A and 6B provide views of an example riveted assembly from the side facing away from a conveyor (FIG. 6A) and the side facing the conveyor (FIG. 6B).

DETAILED DESCRIPTION

Disclosed herein are aspects of a conveyor system that may be used with product transfer, sortation, and mover systems. Such systems may be used when transferring products into warehouses, factories, and various places where product moving, and sorting are needed. Some embodiments may employ a conveyor having a plurality of flexible conveyor segments. In some embodiments, the conveyor may include a plurality of flexible conveyor segments coupled together in series.

A complex system, consisting of different types of conveyors, scanners and sortation modules connected in series is utilized to safely and efficiently unload trucks. Each part of the system may provide an important role in efficiently unloading a trailer and subsequently transferring the boxes from the trailer to a storage location.

Traditionally, ad hoc flex conveyors have been used for moving boxes from the trailer into an intelligent gapping and sortation system, or in some cases on to a powered/non-powered conveyor. A dedicated 'gapping' conveyor may receive the boxes from the ad hoc flex system and then gaps the boxes before feeding the boxes into a scanning system. Gap between boxes may provide a barcode scanner to better read and sort boxes for better redirection and sorting the boxes for shelving or distribution. One challenge of using traditional ad hoc flex conveyors is the possibility of an increased footprint of the system, requiring more size and spacing requirements of the system because more conveyors may be needed to operate the system, and thus, increasing the cost of the overall system.

Figure 1:
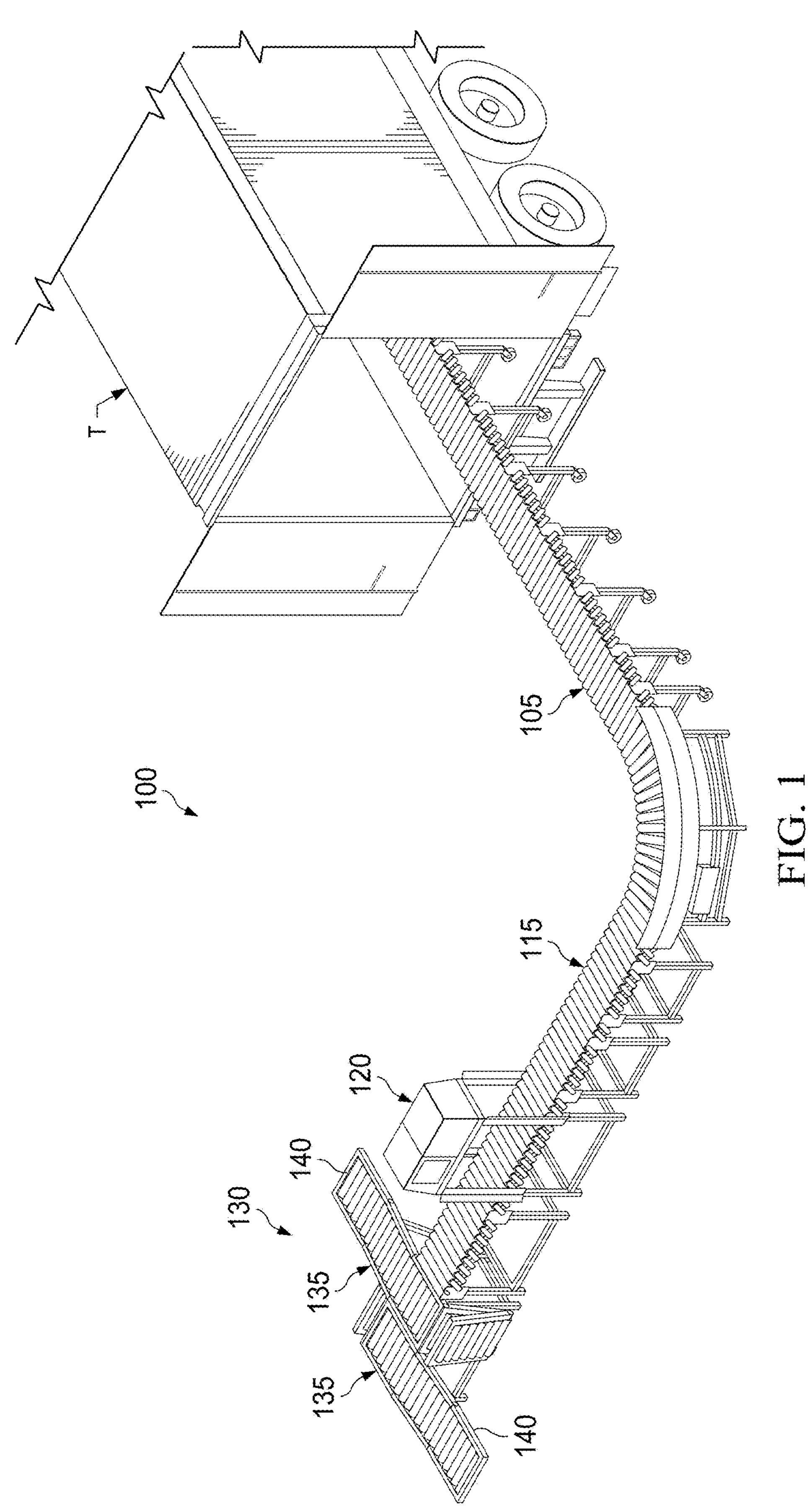
FIG. 1 illustrates an embodiment of a product mover system according to the principles of the present disclosure.

By closing a distance from where boxes and products are unloaded, embodiments of flexible conveyors disclosed herein may improve the overall efficiency of the system enabling more product (measured in boxes/minute) to be transferred with reduced manpower requirement. The flexible conveyors according to the disclosure may also provide ergonomic benefits by lessoning time required for unloading and product movement, compared with traditional time requirements. Traditional flex conveyors used in the industry have included ad hoc conveyors whose primary purpose is solely to move the boxes from the trailer into an intelligent gapping and sortation system, or in some cases on to a powered/non-powered conveyor. A dedicated 'gapping' conveyor receives the boxes from the ad hoc flex system and then gaps the boxes before feeding the scanning system. Gaps between boxes loaded onto a system such as the system shown in FIG. 1 is critical so that when the boxes pass through the scanner, the barcodes are correctly read by the scanner and the sortation system can efficiently sort/redirect boxes such that they may be stored at the correct shelves. A traditional ad hoc flex conveyor generally increases the overall footprint of the system (more conveyors involved in running the system), and as a result, the overall cost of the system may be higher due to the extra pieces of equipment required.

Automation equipment manufacturers desire to design and build compact equipment that can fit into limited space confines of certain workspaces, such as a retail warehouse, and yet are portable enough to be moved around to make optimum use of the available floor space. Presented herein are aspects of flexible conveyors having a plurality of conveyor segments, which may be used with various product moving and storage systems and in some embodiments, may be used with an automated sortation and product movement system along with collapsible product movers that may be used in various spaces, including limited space environments. A product moving system which may be used to unload trucks and move boxes and products within a warehouse may include different types of conveyors, one or more bar code scanners and a sortation module, which in some embodiments may be connected in series.

FIGS. 1 to 4D illustrate a flexible conveyor, components of a flexible conveyor, and a product mover system that includes such a flexible conveyor. FIGS. 5A to 6B illustrate components of a flexible conveyor that address possible sagging of the conveyors over time and improve assembling of flexible conveyors.

Referring now to FIG. 1 is shown one embodiment of a product mover system 100. In this embodiment, the system 100 includes one or more incoming conveyors, such as a plurality of conveyor segments 105, which may include flexible conveyor segments and some segments that may couple together and adjust to varying floor/surface heights. The conveyor segments 105 may connect with an infeed conveyor 115. The system 100 may also include a bar code scanner 120, and at least one sortation module 130. In some embodiments, the plurality of segments may include segments 105 connected directly with or into a delivery trailer T. Some segments, in some embodiments, may be expandable conveyor and other segments may be coupled together such that the conveyor segments 105 may be able to contour and be self-supporting even on an uneven transition zone between a truck or trailer and warehouse. The plurality of conveyor segments 105 moves the product to the infeed conveyor 115 in to the bar code scanner 120.

In some embodiments, each conveyor segment 105 may include casters and may therefore be moved easily into the trailer T, and around to and from various locations in a warehouse. Each conveyor segment 105 may be flexed to various lengths and may be connected in series. As the trailer T starts to empty out, conveyor segments 105 may be pulled further into the trailer T until the trailer T is eventually unloaded. Additional conveyor segments 105 may be added in series to allow for various distances. Each conveyor segment 105 may have a logic module and when connected in series, each segment 105 may communicate with one or more controllers in the system 100.

The scanner 120 determines the direction in which the product needs to be redirected in order to be stored at desired location. The scanner 120 generates a signal that corresponds to the direction and is used by the sortation module 130. For example, a controller of the sortation module 130 may receive the signal and direct operation thereof based on the signal. The sortation module 130 receives the signal from the scanner 120 and performs a divert and sort function to enable the product to be moved in the desired direction. One embodiment of the sortation module 130 may include at least one product sorting and transfer module 135 which may comprise a direction changing transfer module and collapsible product movers 140 or wings coupled to each side thereof. The collapsible product movers 140 may be self-supporting or may be attached to another component of a product transfer system as shown in FIG. 1.

The sortation module 130 may be configured or programmed to sort products based on an identifier, such as a product identifier, that is located on the product or, for example, packaging of the product. As products travel along the conveyor segments 105 and infeed conveyor 115, the scanner 120 communicates the product identifier for each package or product container with the one or more transfer modules 135 of the sortation module 130. The scanner 120 can communicate with a controller or controllers of the transfer modules 135 to direct the operation of the transfer modules 135 for product transfer onto one or more collapsible product movers 140.

In the embodiment shown, the collapsible product movers 140 are foldable and are coupled onto the sorting and transfer modules 135, but there may be other embodiments where the product movers 140 may have independent support structures. Based on the product identifier, the transfer modules 135 will determine onto which of the collapsible product movers 140 the product needs to be transferred. Each of the transfer modules 135 may transfer the product in at least 2 flow paths, either in line or parallel with the incoming path of the infeed conveyor 115, or substantially perpendicular, either turning "right" or "left" off of the transfer modules 135. Each transfer module 135 may include may include a first and second shuttle, which may be nested and configured such that as one of the first and second shuttles may be raised to a first plane, at a substantially similar level as the plane of infeed conveyor 115, the other shuttle is lowered below the first plane. A cam system may be positioned beneath the first and second shuttles, each having a plurality of cams configured to engage the first and second shuttles to raise them to the first plane and lower them below the first plane. The first shuttle may include a plurality of rows of pulleys connected by a belt system. In one embodiment, a powered roller may be positioned beneath the rows of pulleys, wherein the powered roller may engage and turn the belts connecting the series of pulleys in each row. A frame may support the rows of pulleys and powered roller. The frame may include mounting blocks positioned beneath the rows of pulleys, the mounting blocks for engaging the cam system.

The second shuttle may include a plurality of rollers, wherein the plurality of rollers includes one or more driving (powered or motorized) rollers and a plurality of driven rollers. The plurality of rollers may be connected through a belt system, such as a network of serpentine belts wherein the driving rollers and the belt system cooperate to rotate the driven rollers of the plurality of rollers. A mounting frame may support the plurality of rollers and includes mounting blocks for engaging a cam system.

The product movers 140, in one embodiment, may include, in one embodiment, include a plurality of rollers, in some embodiments idle rollers, that facilitate the movement of a product such as a box along the desired direction. In some embodiments, the product movers may have collapsible, folding wings, such that the product movers may be collapsed and use less space on a production or warehouse floor, which may be a drawback of traditional product mover and conveyor systems. In one embodiment, the product movers may be opened or unfolded when required during operation and subsequently closed or folded in a compact manner when not in use. Thus, the product movers may be configured to be easily stored in a compact form. Portions of the product movers may be coupled via a hinge. The hinge may, in some embodiments, include mechanical stops which provide a desired range of motion, enabling the product movers to open and allow product to travel along the rollers while preventing the product movers from opening too far or failing due to excessive weight placed onto them wings. The hinge, in some embodiments, may also provide a load bearing capacity of up to 410 lbs. (static loading) and/or 62 lbs. of peak load bearing capacity (cyclic loading) before yield. The hinge designed to provide the degree of freedom for the product movers to open and close and may be designed with built in mechanical stops to not only provide a limited degree of rotation to the wings but also to enable the sub-assembly to carry the pre-determined sets of loads Referring now to FIG. 2A, there is shown a perspective view of one embodiment of a flexible conveyor 200 having a plurality of expandable conveyor segments 205 according to the disclosure. Each expandable conveyor segment 205 may be flexed, both compressed and elongated, and curve along its axis. The conveyor 200 may be used, in some embodiments, at a transition between two points along the product unloading/moving path. A plurality of conveyor segments 205 may be connected in series such that the conveyor 200 may be moved closer to products, rather than follow generally followed strategy to move the product (in batches) to the conveyor 200 and sortation modules. The conveyor 200 may be used, in some embodiments, to reduce a distance from where boxes and products are unloaded the conveyor, which may provide efficiency benefits for a product moving system by enabling more product (measured in boxes/minute) to be transferred with reduced manpower requirement and also result in product mover systems needing less equipment components. The conveyor 200 may also provide ergonomic benefits by lessoning time required for unloading and product movement, compared with traditional time requirements.

The conveyor segments 205 may provide all the functional advantages of a traditional flex conveyor, but in addition may maintain a constant belt tension on the rollers. In addition, some embodiments may include an electrical controls program built into the conveyor segments which may enable a plurality of sections 205 to communicate with each other, in some embodiments via an Ethernet cable, and enable a speed of each zone in the conveyor 200 to be controlled to gap boxes. With the built-in gapping feature and the ability to bend around corners, due to its flexibility, the flexible conveyor segments 205 according to the disclosure may eliminate the need for, in some embodiments, a curve conveyor, extension conveyor and gapper conveyor, which may reduce an overall equipment cost and space requirement for a conveyor system.

Figure 2A:
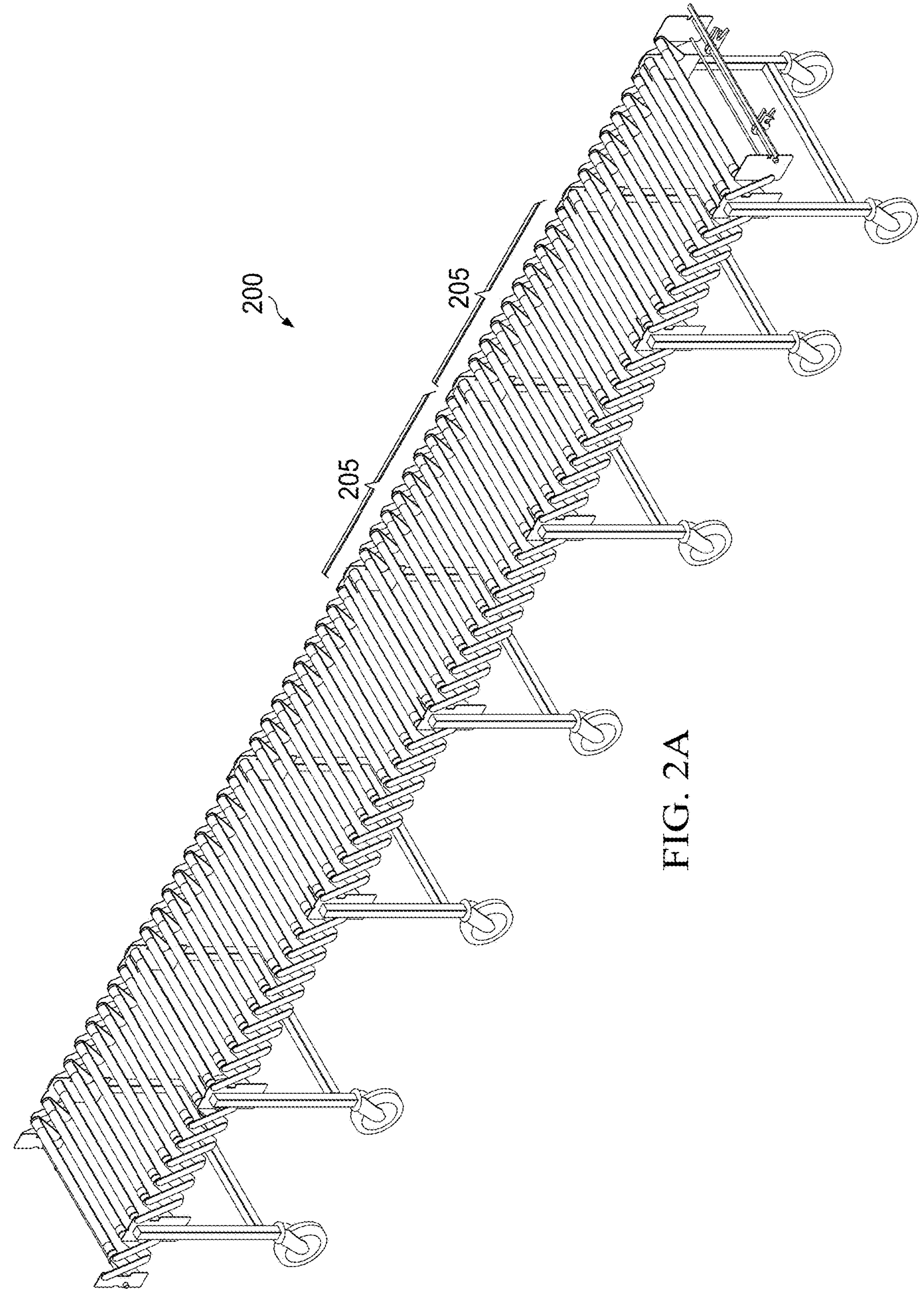
FIG. 2A is perspective view of one embodiment of flexible conveyor having a plurality of expandable conveyor segments according to the disclosure.
Figure 2B:
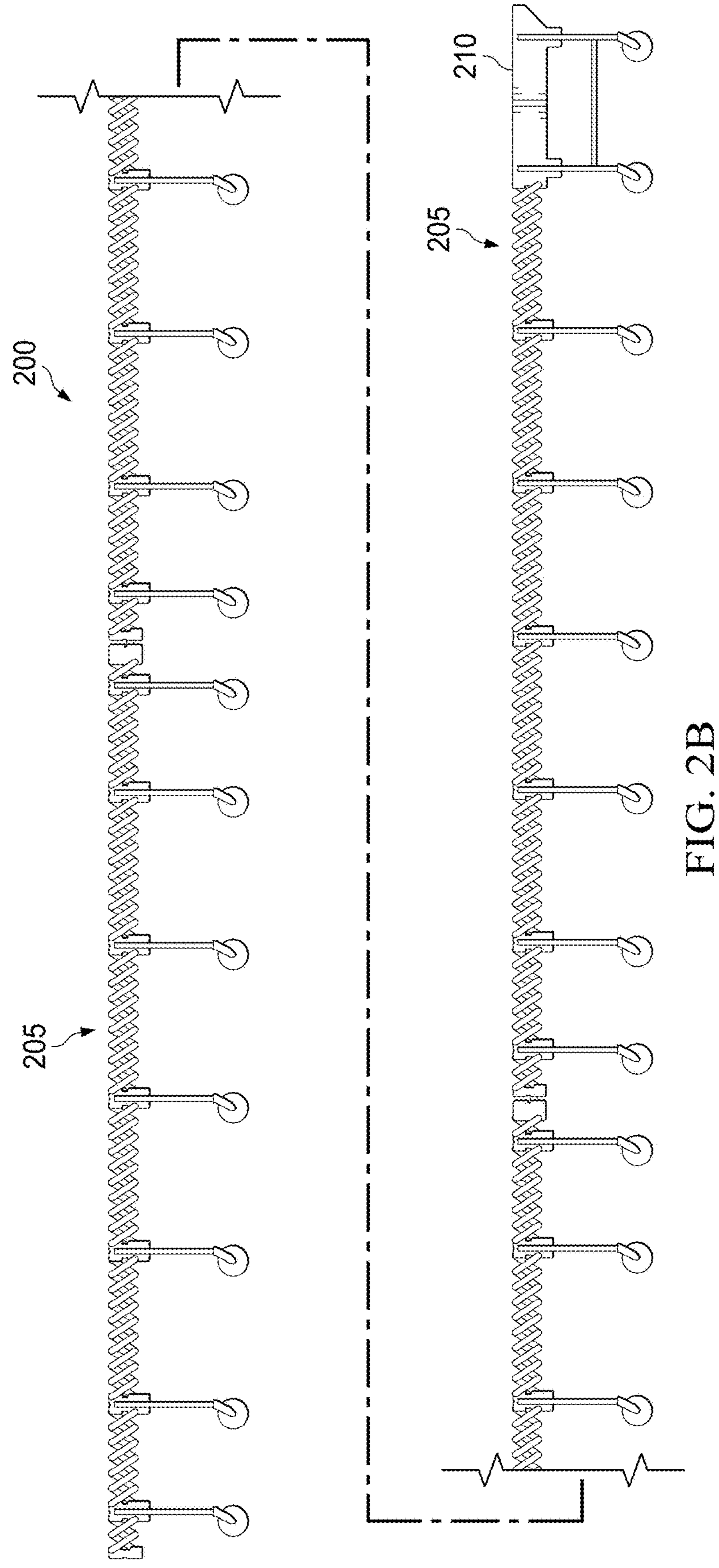
FIG. 2B is a side view of the flexible conveyor shown in FIG. 2A.

Referring to FIG. 2B there is shown a side view of an embodiment of the conveyor 200, which may include a plurality of conveyor segments 205 and at least one loading module 210. The loading module 210, in some examples, may be a receiving conveyor, which may be placed inside or outside of a trailer, such as trailer T. The loading module 210 may include a frame 215, which may be a rigid frame in order to absorb shock loads from boxes of varying size and weight from being thrown or loaded onto loading module 210. In some embodiments, boxes or product may be loaded, thrown in some examples, onto the loading module 210 from a height of at least 5 feet above the conveyor 200. In some embodiments, the loading module 210 may absorb impact loads of about 100 lbs. The frame of the loading module 210 may absorb side impact loads of 1000 lbs. when traveling at 2 mph.

Figure 3A:
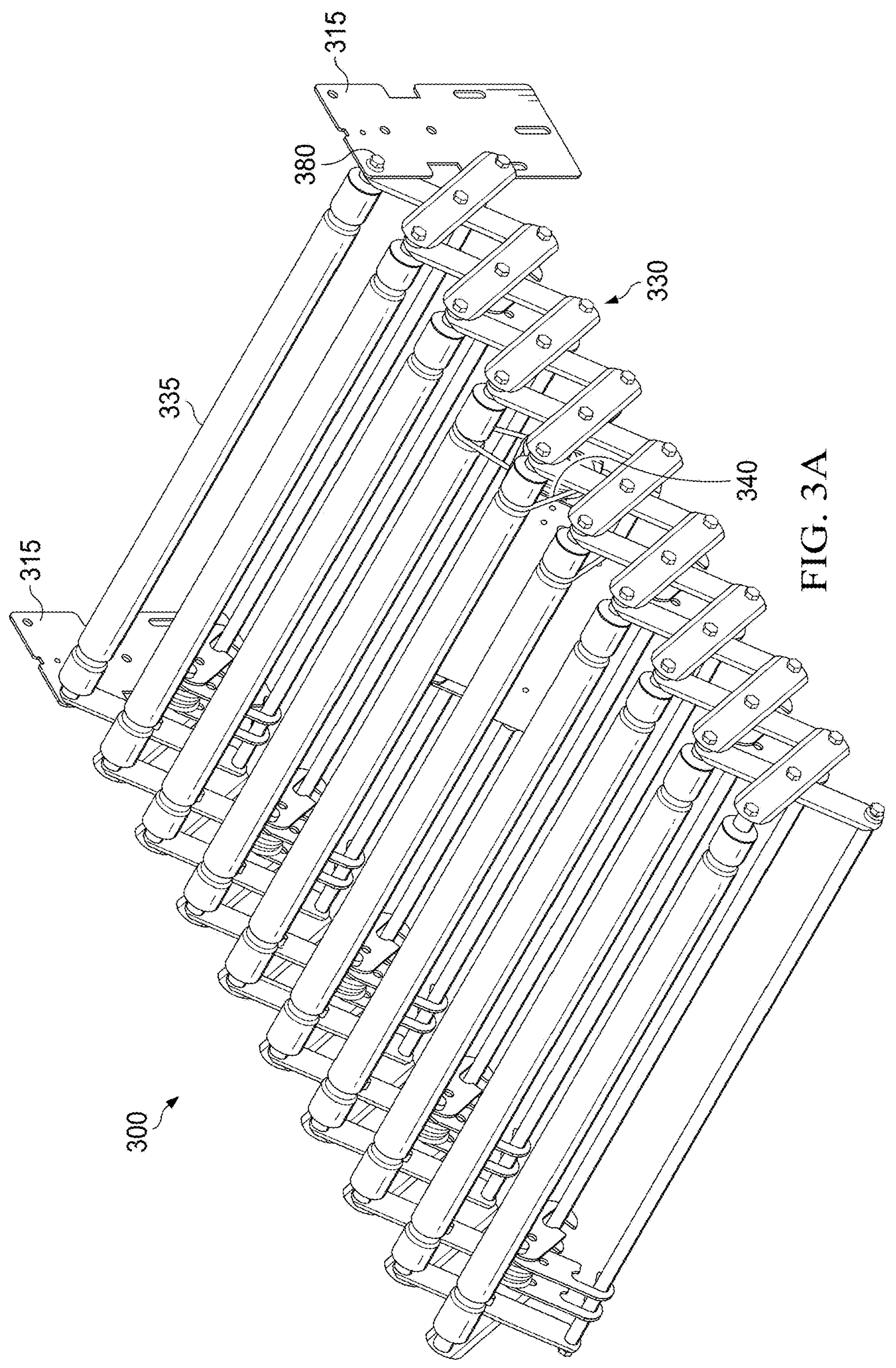
FIG. 3A is a perspective view of a conveyor segment according to principles of the disclosure.

Referring now to FIG. 3A, there is shown one embodiment of a conveyor 300 having a plurality of flexible conveyor segments 305 which may flex both length-wise and curve along its axis. Each conveyor segment 305 may include at least an end frame 315. Coupled to each side of the end frame 315 may be a plurality of x-bars 330. In some embodiments, the x-bars 330 may be expandable and/or adjustable. The x-bars 330 may provide a side-frame structure for each conveyor segment 305. A plurality of rollers 335 may be coupled between the x-bars 330 for supporting and moving product thereon. In some embodiments, the outer bars 345 and inner bars 355 of the x-bars 330 may be rotatably coupled with each other to create a scissor mechanism. By pulling or pushing on the conveyor segment 305, spacing between the plurality of rollers 335 may be minimized or maximized. The plurality of rollers 335 may, in some embodiments, be belt driven. The kinematic arrangement of the x-bars 330 may enable the belt tension on a belt 340 connecting the rollers 335 to be substantially equal with each other whether the conveyor segment 305 is fully compressed or expanded. Substantially equal belt tension may enable the conveyor 300 to provide Zero Pressure Accumulation (ZPA) in a product moving system, which ensures box are gapped before they are fed downstream of the conveyor 300. In some embodiments, the belt 340 may be driven by a motor (not shown), which in some embodiments may be positioned beneath the plurality of rollers 335, or in some embodiments, may be positioned on or supported by the end frame 315.

Figure 3B:
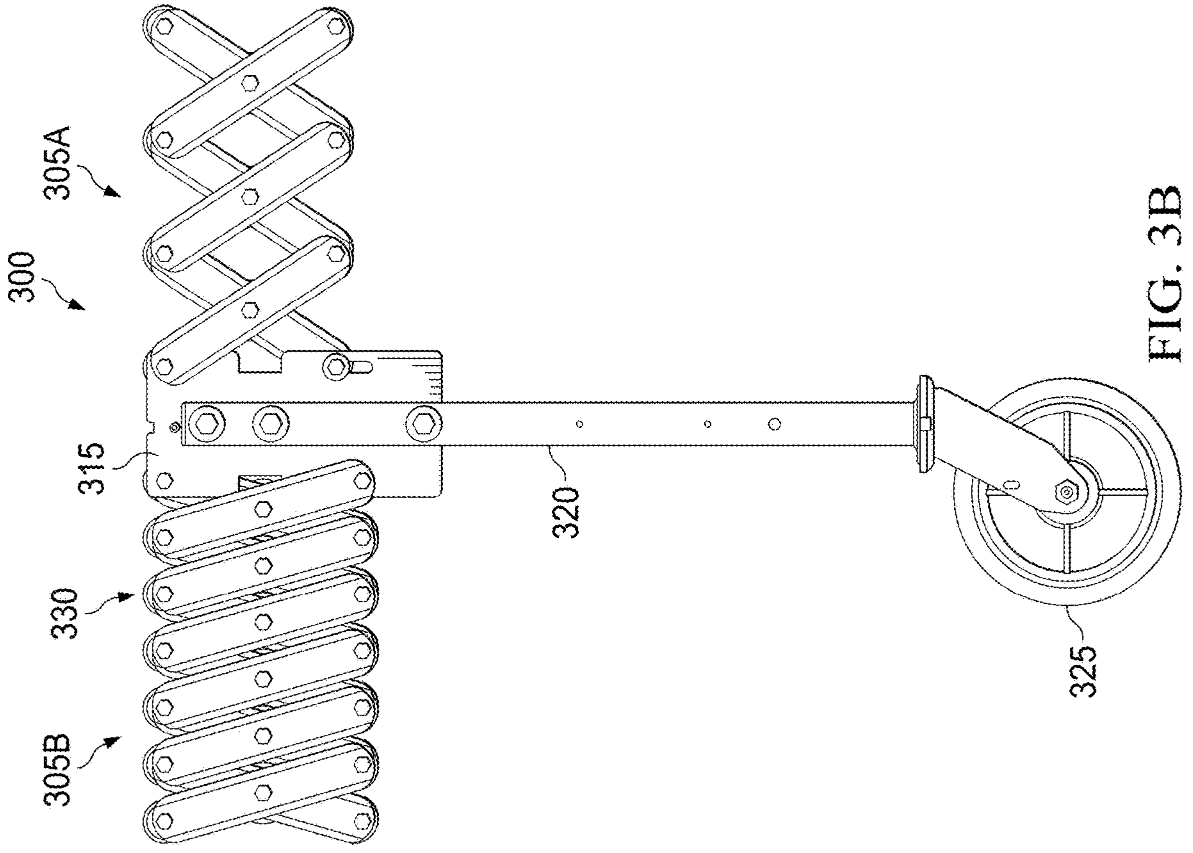
FIG. 3B is a side view of several segments connected with other to form multiple zones of a conveyor according to principles of the disclosure.
Figure 3C:
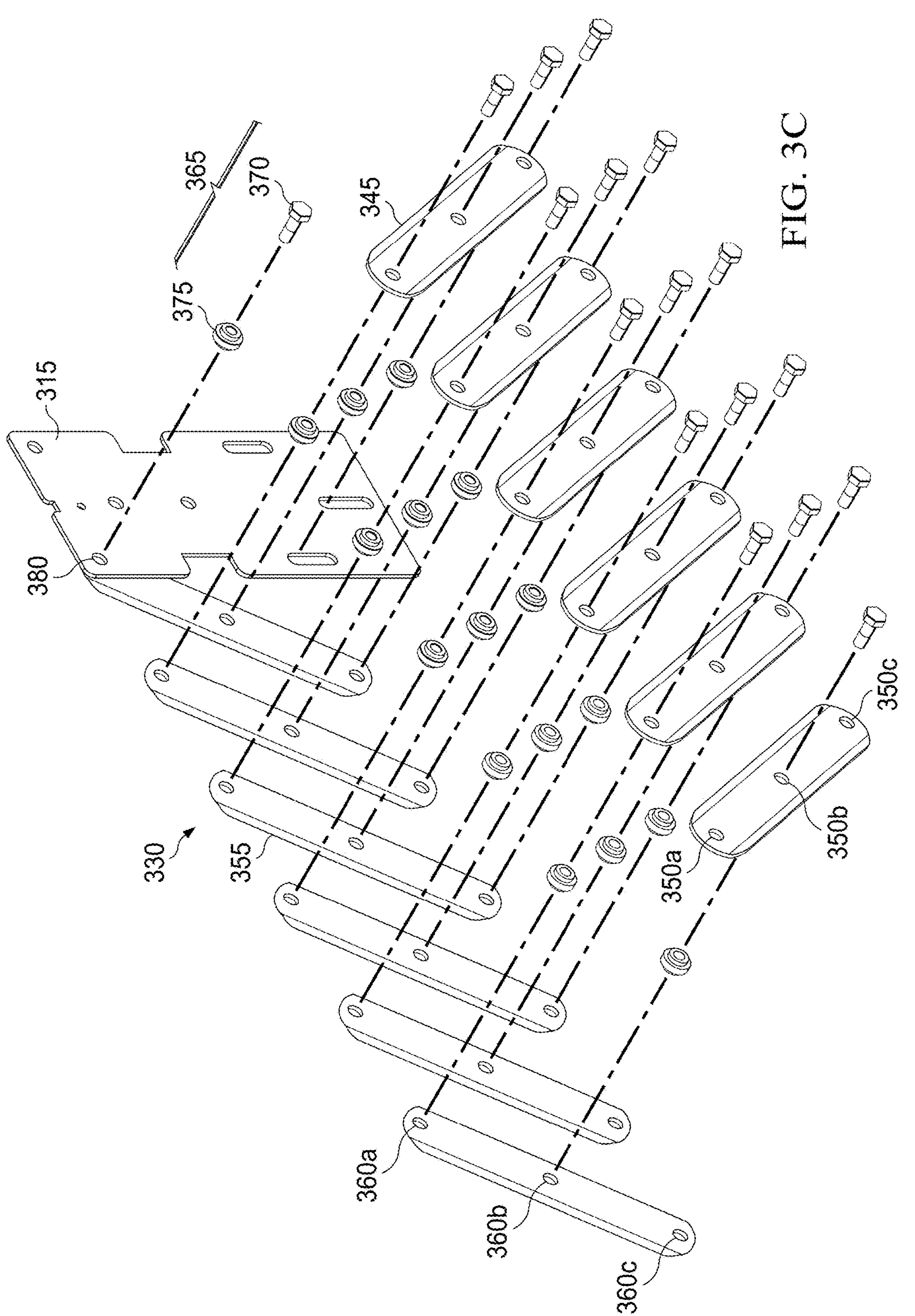
FIG. 3C is an exploded view illustrating features of the x-bars according to the disclosure.

Referring to FIG. 3B, there is shown a side view of a portion of a conveyor 300 including at least a first segment 305A and second segment 305B. The end frame 315 may be supported by legs 320, which in some embodiments may include wheels 325. The wheels 325 may be castors, or various other wheels used in industrial product moving equipment. As shown in FIG. 3C, first segment 305A may expanded while adjacent second conveyor segment 305B may be compressed. Accordingly, each conveyor segment 305 along a conveyor 300 may expand or contract/compress as needed.

Referring to FIG. 3C, there is shown an exploded view illustrating features of the x-bars 330 according to the disclosure. Each x-bar 330 may include an outer bar 345 having, in some embodiments, three coupling joint points—a first joint point 350*a*, a second joint point 350*b*, and a third joint point 350*c*. An inner bar 355 may likewise have a first, second, and third joint point 360*a*, 360*b*, and 360*c*. Each outer bar 345 may couple with the inner bar 355 at the second joint points of both 350*b* and 360*b*. The first joint point 350*a* of each outer bar 345 may couple with the first joint point 360*a* of the inner bar 355 of an adjacent x-bar 330 on one side and likewise the third joint point 355*c* of the outer bar 345 may couple with the third joint point 360*c* of the inner bar 350 of an adjacent inner bar 355 on an opposing side. Each of these joint points 350*a-c* and 360*a-c* may function as a rotation point to allow the conveyor segment 305 to expand and contract. A double-shouldered spacer 365 may be used to couple the outer bars 345 with the inner bars 355 at each of the joint points 350*a-c* and 360*a-c* and likewise to couple an end x-bar 330 with the end frame 315.

The spacer 365 may include a custom bolt 370 and washer 375, and may each include a machined surface on at least one side thereof for the x-bars 320 to rotate. The custom spacer 365 may include 2 shoulder sections protruding on either side of the washer 375. The diameters of the shoulders may be fractionally smaller than the hole sizes in the outer bars 345 and inner bars 355. The shoulders of the spacer 365 may then enter and be securely seated inside the openings in the outer bars 345 and inner bars 355. When the outer bars 345 and inner bars 355 are connected, the spacer 365 may be sandwiched between them, and thus, the shoulders on opposing sides of the washer 375 may then be inside the openings of the inner and outer bars 345 and 355. The spacer 365, and shoulders of the washer 375 seated within the openings of the inner and outer bars 345 and 355 may also maintain joint integrity of x-bar 330 during maintenance and repair procedures, enabling the bolt 370 to be removed while preventing the conveyor segment 305 from collapsing. In some embodiments, the end frame 315 may include an upper eye 380 (also shown in FIG. 3A), which may correspond and coupled with the first joint points 350*a* of an adjacent x-bar 330 coupled with the end frame 315.

Figure 3D:
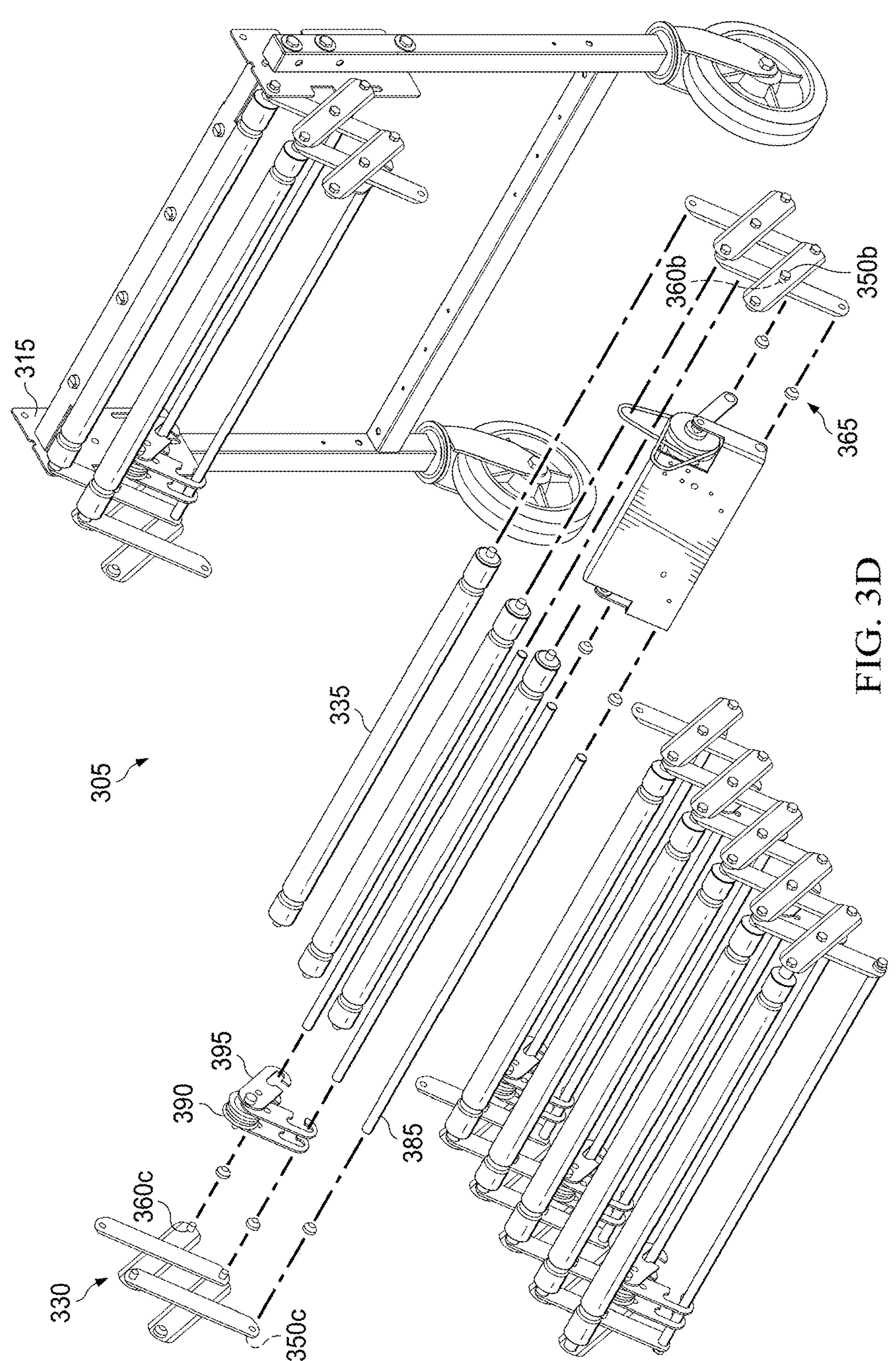
FIG. 3D is an exploded view of the conveyor segment.

Referring now to FIG. 3D, there is shown an exploded view of the conveyor segment 305. Each x-bar 330 may be rotatably coupled or hinged in a center point thereof, at or near the second joint points 350*b* and 360*b* of each of the outer bar 345 and inner bar 355, providing a pivot point near the center of each x-bar 330. In some embodiments, the rollers 335 may also be coupled to the first joint points 350*a* and 360*a* of each x-bar 330, in some embodiments by a bolt and in other embodiments using one or more spacer 365*s*. In some embodiments, bars 385 may be fastened to the third joint points 350*c* and 360*c* of the x-bars. The bars 385 may comprise aluminum, steel, and other metals such that the bars 385 provide additional support for the x-bars 330. In some embodiments, the rollers 335 may be connected by o-ring belts. Pulleys 390 may be mounted above the bars 385 in some embodiments. The pulleys 390 are associated with pulley hooks 395 that attach two of the bars 385. Each conveyor segment 300 may include a plurality of pulleys 390 and pulley hooks 395. Accordingly, belt tension on the rollers 335 may be held at a constant amount regardless of whether the conveyor segment 305 is in an expanded position or a collapsed position. In some embodiments, when connected in series with other conveyor segments 305, each segment 305 may act as an individual conveyor (or independent zone) such that a speed of each segment 305 may be run and controller at an independent speed.

Referring again to FIG. 3A and FIG. 3D, the plurality of rollers 335 may, in some embodiments, be interconnected by a series of belts 340, which may be stretchable rubber belts, or in some embodiments, o-rings. The belts 340 or o-rings may be mounted such that they wrap around each roller 335 on one end of the o-ring, and around the pulleys 390 on the other end of the o-ring as shown. The pulley 390 may be mounted on the bars 385. The x-bars 330 may therefore be connected with both the rollers 335 and pulleys 390 and constant tension may be applied along the length of the conveyor segment 305 whether the x-bars 330, and thus, the conveyor segment 305, are compressed or extended. As each conveyor segment 305 extends or compresses, the pulleys 390 move in a vertical direction, which may maintain a center distance between the rollers 335 and pulleys 390 to always be constant, thereby maintaining a constant tension on the belts 340, or o-rings, because the belts 340 (o-rings) may not be stretched or relaxed once they are mounted about the rollers 335 and pulleys 390. The pulley 390 may freely spin about its bearing thereby enabling the belts 340 (o-rings) to spin and drive the rollers 335 in the desired direction. The bearing of each pulley 390 and the rollers 335 may include grooves as shown in FIGS. 3A and 3D, allowing the belts 340 (o-rings) to be securely seated and prevent the belts 340 (o-rings) from laterally sliding during operation. In some embodiments, a motor may be functionally connected with at least one of the plurality of rollers 335 or alternatively, the pulleys 390 and may be used to drive or turn at least one of the rollers 335 or pulleys 390. The belts 340 may maintain constant tension between the rollers 335 and pulleys 390 enabling a substantially constant belt tension to provide Zero Pressure Accumulation (ZPA) in the product moving system as discussed herein.

Figure 4A:
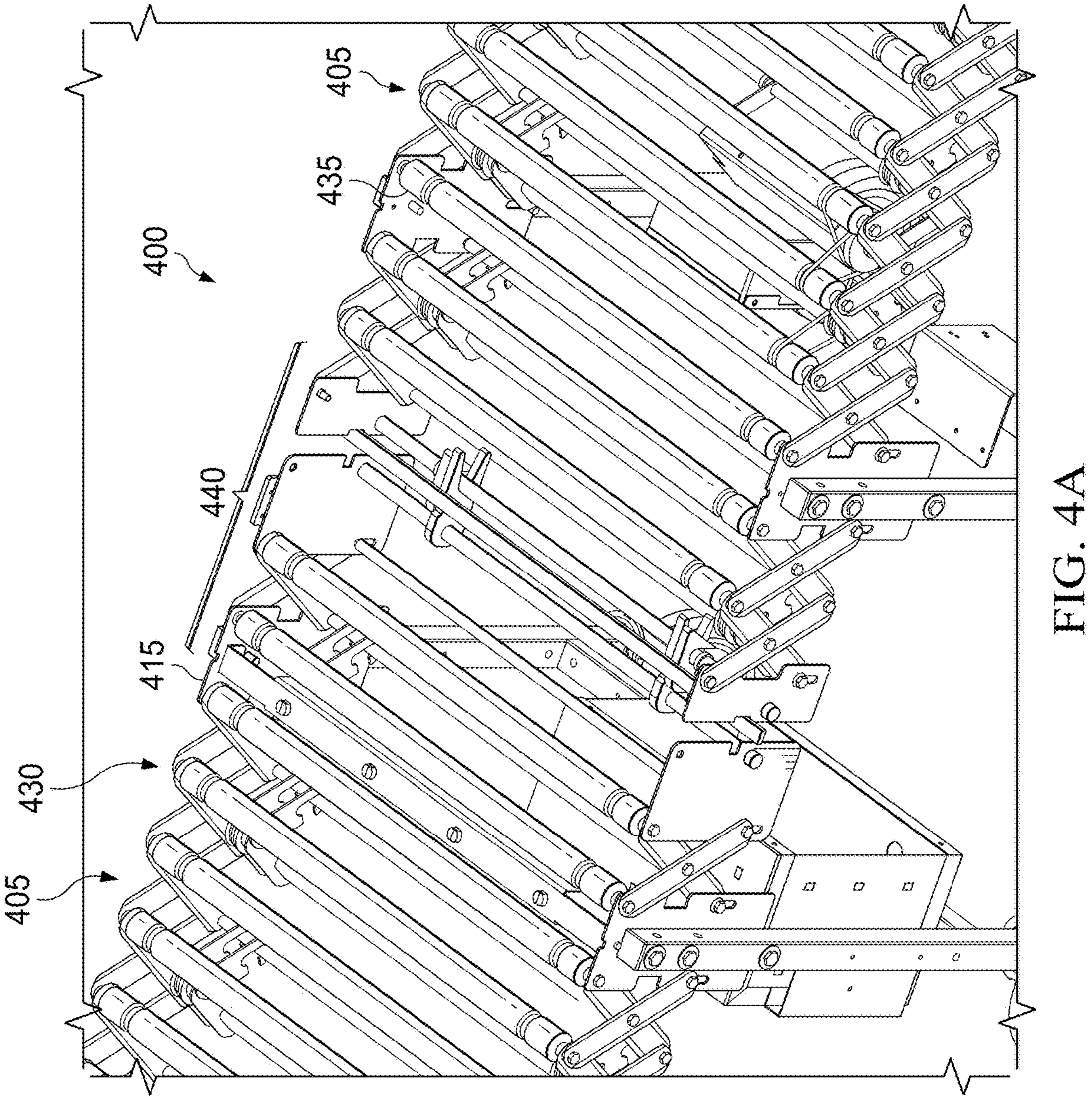
FIG. 4A shows another embodiment of an expandable conveyor according to the disclosure.

Referring now to FIG. 4A, there is shown another embodiment of a conveyor 400 according to the disclosure. The conveyor 400 may include a plurality of segments 405, which may be constructed similarly to segments 305 shown in FIG. 3A-3C and described hereinabove. Each segment 405 may include a plurality of x-bars 430 coupled with an end frame 415 and having a plurality of rollers 435 positioned between the x-bars 430. In some embodiments, the segments 405 may be latched together via a latch assembly 440. In some embodiments, the latch assembly 440 may hold multiple conveyor segments 405 together mechanically over uneven surfaces and the latch assembly 440 may be opened from either side of the conveyor 400.

In some embodiments, each conveyor segment 405 may be controlled via a photoeye sensor. The photoeye sensor may be placed within the end frame 415, or may be placed at various other positions along the conveyor segment 405. When the photoeye sensor on a segment 405 is blocked for a pre-determined amount of time, the photoeye sensor may send a signal to a drive card, which may indicate presence of a box, which may pass a run signal to the motor. The motor may then run the plurality of rollers 435 driving the box forward. In some embodiments, the entire process from the sensor sending the signal to the drive card to the motor (not shown) driving the box forward may take only a few milliseconds. Once the box has been pushed forward and the zone (conveyor segment 405) has been cleared, the photoeye sensor being unblocked initiates a signal at the drive card to stop the rollers until the photoeye is blocked again. In some embodiments, the conveyor segments 405 may communicate with each other which may allow for a synchronized start-stop of each segment 405 (zone). This cyclic method of starting and stopping the conveyor results in creating a Zero Pressure Accumulation (ZPA) which ensures boxes are gapped before they are fed downstream, allowing boxes on the conveyor 400 to be "gapped." Gapping enables boxes to be scanned correctly at the scanner module (such as module 120) further downstream. A gapping function of the conveyor segments 405 may eliminate the need for a specialized gapping conveyor traditionally used in a traditional conveyor system.

Multiple segments 405 may be connected in series through the Ethernet to create a continuous strand of smart flexible conveyor segments 405 of the conveyor 400. The plurality of segments 405 may be connected both mechanically and electrically. In some embodiments, the electrical connection may include a 9-pin connector such that each segment may have its own specific IP address assigned thereto. In some embodiments, once connected, each segment 405 may be dynamically configured to determine its individual IP addresses on the network through Ethernet.

Figure 4B:
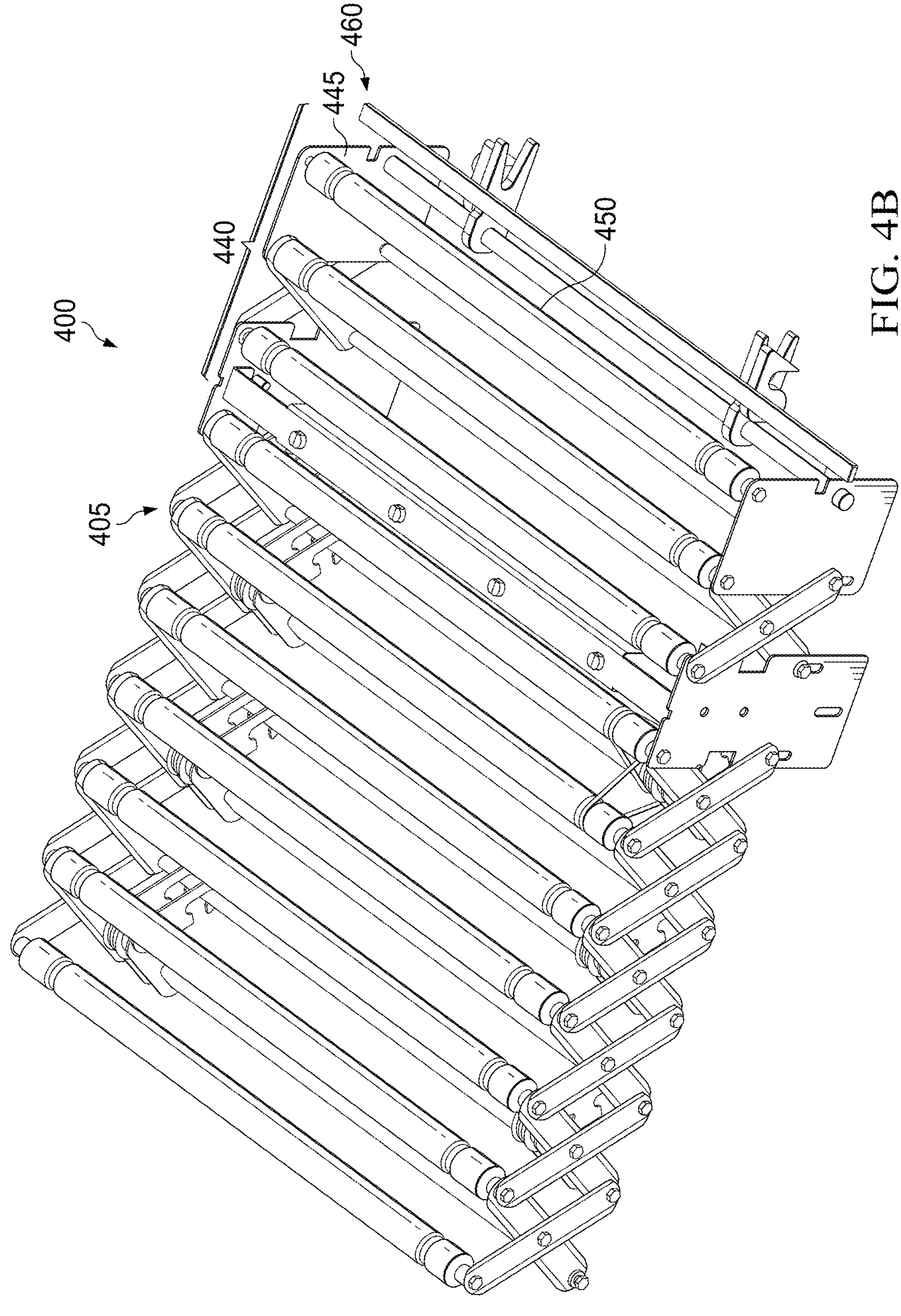
FIG. 4B illustrates an embodiment of a conveyor segment 405 of the expandable conveyor 400 shown in FIG. 4A.
Figure 4C:
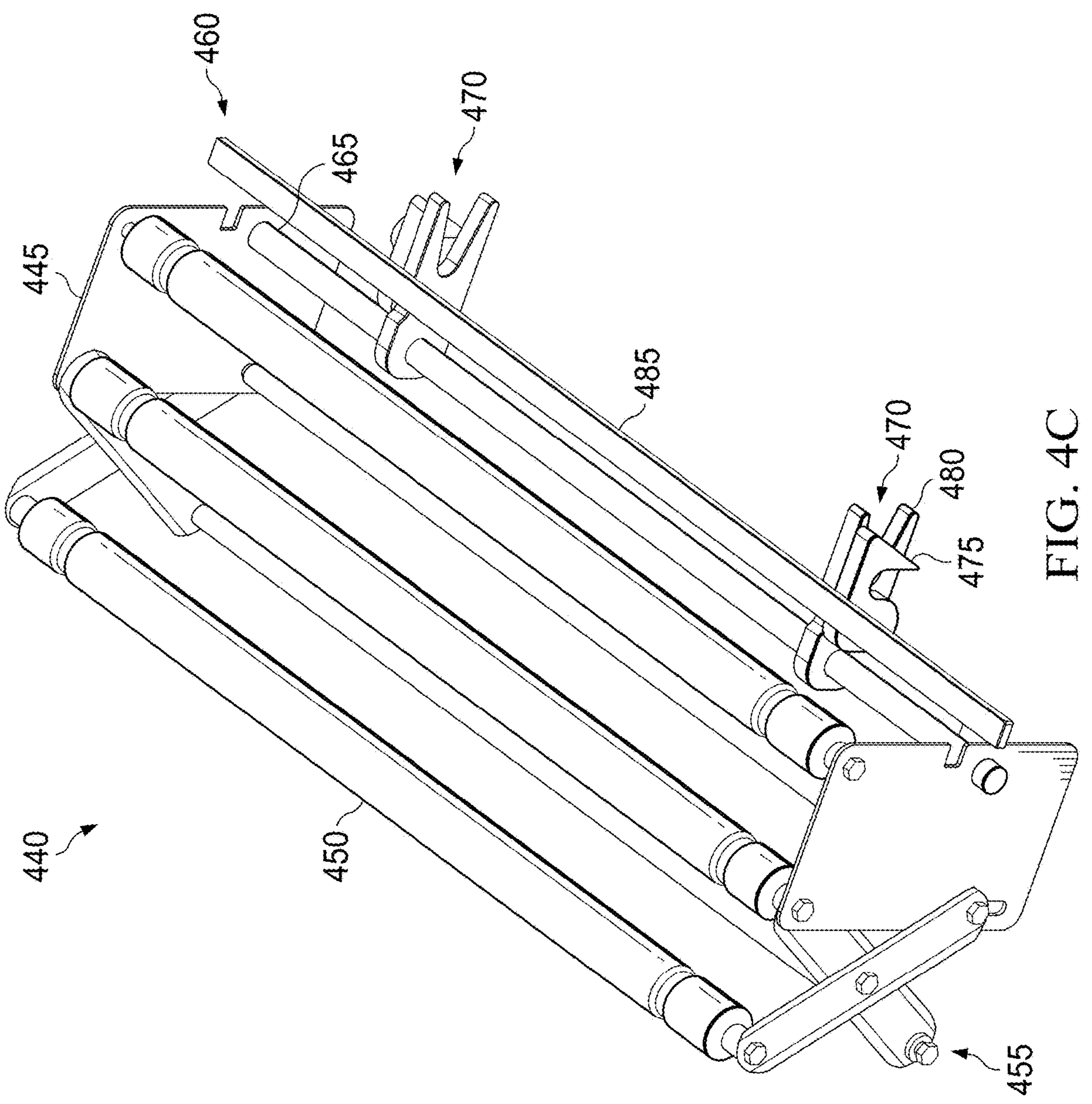
FIG. 4C illustrates one embodiment of a latch assembly which may comprise a portion of the conveyor segment shown in FIG. 4B.

Referring to FIG. 4B and FIG. 4C, there is shown an embodiment of a conveyor segment 405 of the expandable conveyor 400 and the latch assembly 440. The latch assembly 440 may include a latch frame 445, which in some embodiments, may be a mounting plate. In some embodiments, the latch frame 445 may include one or more rollers 450 coupled there between. The latch assembly 440 may also include at least one x-bar 455, which in some embodiments may couple between the end frame 415 and latch frame 445. A support assembly 460, may be coupled between and coupled to the latch frames 445. In some embodiments, the support assembly 460 may be a weldment and be welded to the latch frames 445.

Referring to FIG. 4C, there is shown a detailed view of the latch assembly 440. The latch assembly 440 may include a support bar 465 coupled between the latch frames 445. A latch 470 may be coupled to the support bar 465, and in some embodiments, there may be two or more latches 470 as shown in FIG. 4C. As denoted with respect to one latch 470 in FIG. 4C, the latches 470 may include an upper opening latch member 475 and a stationary lower latch member 480, and a tie bar 485 coupled onto the upper latch member 475. The tie bar 485 may allow an operator to latch or unlatch the adjacent conveyor segment 405 from either side of the conveyor 400. In some embodiments, the tie bar 485 may extend between the two or more latches 470, and in some embodiments, extend beyond the latches 470 and span at least the width of the latch assembly 440. In some embodiments, the latches 470 may couple to and about a bar of an adjacent segment 405, such as the bars 385 shown and described in FIG. 3D.

The latch assembly 440 may hold each conveyor segment 405 together over uneven surfaces and may be operated from one side. The latch assembly 440 may be placed on either side of each conveyor segment 405 to be ensure a secure connection between conveyor segments 405. The latch assembly 440 may include a support bar 460 a latch may be placed on either side of each segment and may be attached to each other by a tie bar, which may allow an operator to latch or unlatch the segment 405 from either side. In some embodiments the latch assembly 440 may incorporate at least two latches 470, providing 2 points of contact, to provide a secure connection point between adjacent conveyor segments 405 while still allowing for rotational freedom or each segment 405. The latches 470 may be aligned as such that a “waterfall” effect is created between two connected segments 405, which prevents conveyed boxes or items from becoming stuck between conveyors. These latches assemblies 440 may be designed to attach a segment 405 to any other part of a product mover or conveyor system, such as system 100 shown in FIG. 1.

Figure 4E:
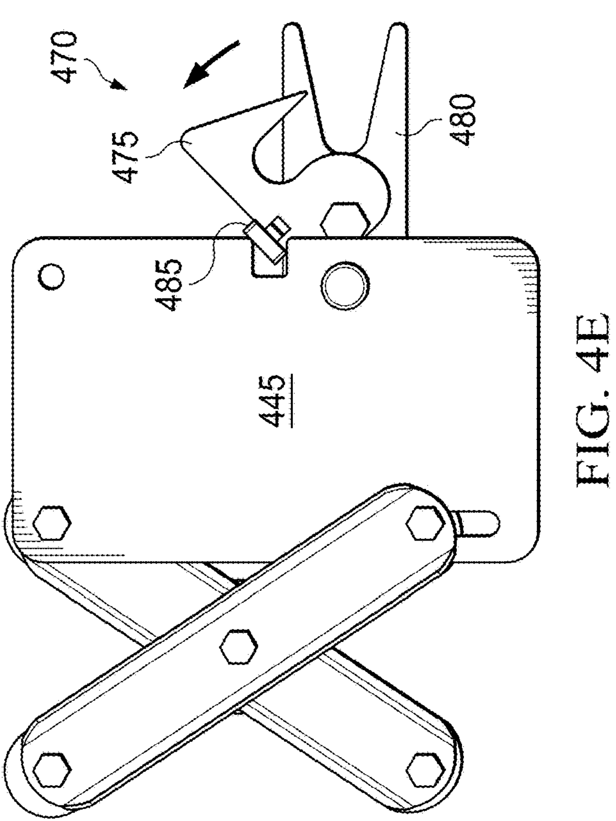
FIG. 4E is a side view of the latch assembly with the latch member shown in an open positon.
Figure 4D:
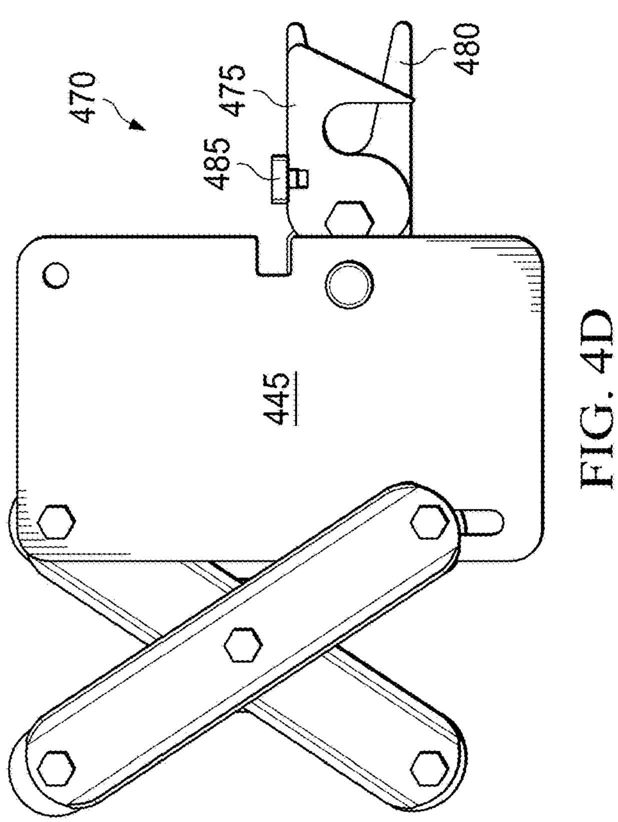
FIG. 4D is a side view of the latch assembly with the latch member shown in a closed positon.

FIG. 4D is a side view of the latch assembly 440 with the upper opening latch member 475 and tie bar 485 of the latch 470 shown in a closed, or latched positon over the stationary latch member 480. FIG. 4E illustrates the latch assembly with the upper opening latch member 475 of the latch 470 shown in an open positon over the stationary latch member 480.

Disclosed herein are aspects of conveyors having a plurality of segments having flexibility in their frames such that each segment may flex and curve along its primary axis. As noted above, the conveyors include X-bars and end frames. X-bar 330 and end frame 315 are used as examples. Sometimes portions of the flexible conveyors can sag after use. Sagging may be found within the expandable conveyor segments 205 with a gentle bowing of the conveyor between end frames 315. Additionally, sagging may occur at the ends of the flexible conveyors where the last end frame tilts over and the last leg 320 tilts toward the remainder of the conveyor. This causes the rollers 335 to have a lower height relative to the floor at the last end frame than the rollers in the sections of the flexible conveyor that are located between two end frames 315. This sagging may result in reducing the flexible conveyor's mobility as well as decreasing the ability for boxes to move across the rollers of the flexible conveyor. This sagging also hinders an additional flexible conveyor from latching to the sagging end of this conveyor because of the height differences of their mating parts. This is very likely a result of component wear in the end frames as well as tolerance stackups in the X-bar connections. The component wear can be due to a bolt sliding back and forth in the slot of the end frame, resulting in widening the slot and thinning the end frame. This in turn is likely a contributing factor in conveyor sag as the bolt has a larger side to side distance that it can move, which results in tilting of the leg. Advantageously, the disclosure provides improved X-bars and end frames that can prevent or at least reduce the sagging.

Additionally, the above disclosure has a disadvantage in that the bolted connection between the inner bars, outer bars, and rollers results in the need for assembly of all of these components to occur at the same time in order for the expandable conveyor segments to remain structurally intact. This results in difficulty in assembling components such as cables between the rollers and the lower bars 385 or in changing out an O-ring or roller when they need to be replaced. With the improved X-bars, the inner bars and outer bars are riveted together instead of connected using bolts. This allows the X-bars to remain attached throughout the expandable conveyor segment, even when only a few rollers or lower bars are in place. This results in the expandable conveyor segment remaining structurally intact. Solid or hollow rivets can be used for one or more of the riveted connections. However, hollow rivets can be used for the ability to use a bolt to pass through the hollow rivet to connect the rollers and lower bars to the X-bar assembly. It can be appreciated that a mixture of hollow and solid rivets, only hollow rivets, or only solid rivets could be used in different embodiments of the riveted X-bars disclosed herein that are used to construct the expandable conveyor. It is also notable that it is possible to use rivets in some X-bar joint points and other methods in other X-bar joint points. Other methods may include shoulder bolts with a nut, a bushing and shoulder bolts with a nut, and others.

Improved end frames are also provided, wherein an improved slot is used to connect the X-bars to the end frames. As noted above, the end frames are connected to the legs, such as leg 320 in FIG. 3B, and the improved end frames are referred to as leg plates. Essentially, the improved X-bars can be used to replace the X-bar 330 and the improved end frame can be used to replace the end frame 315 in the FIGS. discussed above. Additional FIGS. 5A-6B illustrate the improved X-bar and end frame (referred to as riveted X-bar and leg plate) and how they can be used with the other components of the conveyors represented in the above discussed FIGS. In FIGS. 5A-6B, the same element numbers are used for the same/similar components of FIGS. 1 to 4D, such as leg 320 and roller or plurality of rollers 335.

FIGS. 5A and 5B illustrate a leg 320 of a conveyor and portion of an example of a riveted assembly 501 that includes an example of a leg plate and riveted X-bars. In FIG. 5A, two riveted X-bars 530, 535 are connected to leg plate 510, which is connected to the leg 320. Each of the riveted X-bars 530 and 535 include inner and outer bars. Riveted X-bar 530 includes outer bar 532 and inner bar 534 and riveted X-bar 535 includes outer bar 537 and inner bar 539. Unlike end frame 315, leg plate 510 includes inserts that contain slots (and denoted as slot inserts) where one end of an inner bar or outer bar of the riveted X-bars 530 and 535 are connected to the leg plate 510. For example, slot insert 520 is visible on the outer surface of leg plate 510 in FIGS. 5A and 5B and inner bar 539 of riveted X-bar 535 is connected to leg plate 510 via the slot insert 520 using a bolt, washers, and extended shaft 540. The slot inserts can be separate components that are attached to the leg plates, such as shown in FIG. 5A wherein the slot insert 520 is attached to leg plate 510. The slot inserts can also be integrated with the leg plates. For example, the leg plate 510 or a portion thereof can have a thickness or material hardness comparable to the slot insert 520. As such, the disclosure also provides leg plates having one or more integrated slots that can be used for connecting X-bars, such as riveted X-bars 530 and 535. FIGS. 5B and 5C show an exploded view of the riveted assembly 501 of FIG. 5A.

FIGS. 6A and 6B provide views of the example riveted assembly 501 from the side of the outer surface (FIG. 6A) and from the side of the inner surface (FIG. 6B), wherein the outer surface is further from the centerline of the conveyor than the inner surface. As shown in FIGS. 6A and 6B, there is one slot insert on each side of the leg plate 510, slot insert 520 as shown in FIGS. 5A and 5B and slot insert 525. Slot inserts 520 and 525 can be hardened inserts. The slot inserts 520 and 525 can be mechanically connected to the leg plate 510, such as via rivets, bolts, or welding. The bolts passing through the slot inserts 520, 525, may contain a bearing surface, such as the shoulder in a shoulder bolt. Using FIG. 6A as an example, bolt 512 moves up and down as the flexible conveyor is expanded and contracted. As the bolt 512 rubs against the surface of the slot insert 520, which can be a hardened surface and a thicker surface than the leg plate 510, there can be less wear on slot 612 compared to, for example, the slots of end frame 315 such as shown in FIGS. 3A, 3B, and 3C. This in turn results in less tilt in the end leg plate and less conveyor end sag. It can be anticipated that the slot insert, such as slot inserts 520, 525, could be eliminated in some configurations while achieving the same wear resistance in an alternative structure, configuration, or method. Some of these structures, configurations, or methods may include making the leg plate out of a hardened metal and/or making the leg plate thicker. For example, the thickness can be a sixteenth of an inch to half an inch. In some examples, the thickness can be an eighth of an inch thick.

FIGS. 6A and 6B denote rivets 620 that are used to connect the outer and inner bars 532 and 534 of riveted X-bar 530 and the outer and inner bars 537 and 539 of the riveted X-bar 535. Spacers (not shown in FIGS. 6A and 6B) are installed between the inner bars and outer bar pairs, filling the clearance between the holes in the inner and outer bars. There is enough clearance for the riveted X-bars 530, 535 to continue a scissor motion during expansion and compression of the flexible conveyor, but not more than is required. This reduction in clearance may result in less wear to the X-bar joints, which combine to reduce the roller sag that occurs between leg plates. Advantageously, the riveted assembly 501 also provides enough clearance within the riveted X-bar components and between the riveted X-bar components and components of the leg plate 510 to enable the flexible conveyor to curve. The rollers and lower bar assemblies are centered between the two riveted X-bar frames on the conveyor by bolting them through the hole in the rivet. This unique design allows for the rollers or the lower bars to be added to the conveyor at any point. This is particularly useful during assembly, where it is critical to be able to reach the space between the rollers and the lower bars. For example, routing the electrical cables to control the motors occurs between the rollers and lower bars. Additionally, during field service of the flexible conveyors, a common replacement item is an o-ring. To replace this component, the roller must be removed from the X-bar. Since the riveted X-bar structure is structurally independent from the roller, replacement of this component requires a significantly reduced amount of effort compared to the X-bar structure 330 as shown in FIGS. 3A-3D. Extension shaft 540 is also shown in FIGS. 6A and 6B that is used to connect the riveted X-bar 535 to the pulley hooks 395 (not shown in FIGS. 6A and 6B). The extension shaft 540 is used to lock the sliding bolt 512 in FIG. 5C into the hardened slot insert 520. Other alternative constructions of the extension shaft 540 can be anticipated, such as a full lower bar extending across the width of the conveyor from one leg plate to the next leg plate.

Various embodiments of a flexible conveyor have been disclosed herein. In some embodiments, a smart flexible conveyor segment may have an ability to expand and contract along its axis. The flexible conveyor may have a minimal footprint when not in use and require minimal storage space. Some embodiments of flexible conveyor segments according to the disclosure may be expanded to a desired length to take a conveyor system as close as possible to the product being unloaded from a truck in order to provide a more efficient product transfer than traditional conveyor systems can provide. In one embodiment, a flex conveyor may include six zones or conveyor segments, each driven by a separate drive motor. The speed of each motor (and subsequently each zone/segment) may be controlled via a control program which may be stored, in some embodiments, on a processor such as, e.g., a drive card. Boxes travelling along various zones or segments may be manipulated such that the gaps between each box may be opened or closed, which may facilitate fewer errors when scanning and sorting the boxes further downstream in the process. Multiple segments of one embodiment of the flex conveyor may be connected in series, electrically via an Ethernet cable, such that the conveyors may communicate with each other. Each conveyor segment may then be integrated to create an intelligent conveyor system.

Some claims may include the following features: A conveyor, comprising a plurality of segments, each segment including a frame, the frame comprising a plurality of riveted x-bars on both sides of the frame, wherein the riveted x-bars may be flexed length-wise along a horizontal axis; a plurality of rollers coupled within the frame; a plurality of belts for driving the plurality of rollers; and a latch for connecting each segment to an adjacent segment. In some embodiments, each conveyor segment may include a controller. In some embodiments, each segment may include a photo sensor for sensing when a box or product may be positioned on the plurality of rollers. In some embodiments, the controller may include a processor configured to receive signals from the photo sensor and activate a drive system, such as a motor and pulleys, to drive the plurality of rollers to move product across the segment to an adjacent segment. In some embodiments, each segment may be connected electronically with adjacent segments and each segment may have its own IP address within the conveyor system. In some embodiments, once connected, each segment may automatically determine their individual IP addresses through an Ethernet connection. In another embodiment, once connected, each segment may not have its own IP address but know its location within the conveyor system through other methods.

A portion of the above-described apparatus, systems or methods, such as, e.g., a controller for the conveyor system or for each conveyor segment, and the transfer module controller, may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). For example, a programmable logic controller or an Industrial Computer Processor. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments, such as, e.g., a controller for the conveyor system or for each conveyor segment, and the transfer module controller, may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the example methods and materials are described herein. Each of the below example independent claims may include one or more of the features of the dependent claims in combination.

What is claimed is:

1. An expandable conveyor segment, comprising:

a leg plate;

a plurality of riveted x-bars coupled with the leg plate; and a plurality of rollers coupled to the plurality of riveted x-bars, wherein at least one of the plurality of riveted x-bars includes an inner bar and an outer bar that are coupled together via a hollow rivet at a center joint point.

2. The conveyor segment according to claim 1, further comprising at least one slot insert that is used for coupling at least one of the riveted x-bars to the leg plate.

3. The conveyor segment according to claim 2, wherein the at least one slot insert is constructed of hardened metal.

4. The conveyor segment according to claim 3, wherein the at least one slot insert is constructed of hardened steel.

5. The conveyor segment according to claim 4, wherein the at least one slot insert is integrated with the leg plate.

6. The conveyor segment according to claim 1, wherein the leg plate has a first surface and a second surface that is opposite the first surface, and two slot inserts that each have a thickness greater than a thickness of the leg plate, wherein a first one of the two slot inserts is located on the first surface and the second one of the two slot inserts is located on the second surface.

7. The conveyor segment according to claim 6, wherein the inner bar of one of the plurality of riveted x-bars is connected to the leg plate via the first one of the two slot inserts and the outer bar of another one of the plurality of riveted x-bars is connected to the leg plate via the second one of the two slot inserts.

8. A riveted assembly for use with a conveyor or other flexible transport system, comprising:

a leg plate having a first slot insert and a second slot insert; and two riveted x-bars connected to the leg plate via the first and second slot inserts, wherein one of the two riveted x-bars is connected via the first slot insert and a second one of the two riveted x-bars is connected via the second slot insert, and at least one of the two riveted x-bars includes an inner bar and an outer bar that are coupled together via a rivet at a center joint point.

9. The riveted assembly according to claim 8, wherein the inner and outer bars of each of the two riveted x-bars are coupled together via a hollow rivet at the center joint point.

10. The riveted assembly according to claim 8, wherein the first and second slot inserts have a thickness greater than a thickness of the leg plate.

11. The riveted assembly according to claim 10, wherein the first and second slot inserts are attached to opposite sides of the leg plate.

12. The riveted assembly according to claim 8 wherein the first and second slot inserts are integrated with the leg plate.

13. An expandable conveyor system, comprising:

two or more conveyor segments, wherein each of the conveyor segments have a plurality of rollers and are coupled together via a riveted assembly, wherein the riveted assembly includes a leg plate and two riveted x-bars connected to the leg plate, wherein at least one of the two riveted x-bars includes an inner bar and an outer bar that are coupled together via a rivet at a center joint point.

14. The expandable conveyor system according to claim 13, wherein the rivet is a hollow rivet.

15. The expandable conveyor system according to claim 13, wherein the leg plate includes two slot inserts and a first one of the two riveted x-bars is connected to the leg plate via a first one of the two slot inserts and a second one of the two riveted x-bars is connected to the leg plate via a second one of the two slot inserts.

16. The expandable conveyor system according to claim 15, wherein the two slot inserts have a thickness greater than a thickness of the leg plate.

17. The expandable conveyor system according to claim 16, wherein the two slot inserts are integrated with the leg plate.

18. The expandable conveyor system according to claim 17, wherein the two slot inserts are attached to the leg plate.

19. The expandable conveyor system according to claim 15, wherein each one of the two slot inserts is attached to an opposite side of the leg plate.

* * * * *